US010598780B2

(12) United States Patent
Bellett et al.

(10) Patent No.: US 10,598,780 B2
(45) Date of Patent: Mar. 24, 2020

(54) METHOD AND SYSTEM FOR DISPLAYING AN AREA

(71) Applicant: GroundProbe Pty Ltd, Windsor, Queensland (AU)

(72) Inventors: Patrick T. Bellett, Windsor (AU); David Noon, Windsor (AU); Lachlan Campbell, New Farm (AU)

(73) Assignee: GROUNDPROBE PTY LTD, Windsor (AU)

(*) Notice: Subject to any disclaimer, the term of this patent is extended or adjusted under 35 U.S.C. 154(b) by 451 days.

(21) Appl. No.: 15/037,284

(22) PCT Filed: Dec. 3, 2014

(86) PCT No.: PCT/AU2014/050395
§ 371 (c)(1),
(2) Date: May 17, 2016

(87) PCT Pub. No.: WO2015/081386
PCT Pub. Date: Jun. 11, 2015

(65) Prior Publication Data
US 2016/0291147 A1 Oct. 6, 2016

(30) Foreign Application Priority Data
Dec. 4, 2013 (AU) ................... 2013904705

(51) Int. Cl.
G01S 13/89 (2006.01)
G01S 17/89 (2020.01)
(Continued)

(52) U.S. Cl.
CPC ............. G01S 13/89 (2013.01); G01C 11/02 (2013.01); G01S 7/18 (2013.01); G01S 7/20 (2013.01);
(Continued)

(58) Field of Classification Search
CPC .......... G01S 13/89; G01S 13/867; G01S 7/18; G01S 7/20; G01S 7/51; G01S 7/295; G01S 17/89; G01C 11/02
See application file for complete search history.

(56) References Cited

U.S. PATENT DOCUMENTS 6,346,938 B1 * 2/2002 Chan ................... G06F 3/04815
345/419
8,301,318 B2 10/2012 Lacaze et al.
(Continued)

FOREIGN PATENT DOCUMENTS

WO 2012154365 A2 11/2012

OTHER PUBLICATIONS

International Preliminary Report on Patentability for International Application No. PCT/AU2014/050395 dated Aug. 26, 2015.

Primary Examiner — Andrew T Chiusano
(74) Attorney, Agent, or Firm — Howard & Howard Attorneys PLLC

(57) ABSTRACT

A method for displaying an area on a display device, such as a graphical user interface (GUI), by displaying a front view of the area generated from front view data and a top view of the area generated from top view data according to a first line-of-sight; processing an interaction between an operator and one of the front view and the top view of the GUI; and displaying on the same display device an updated front view of the area and an updated top view of the area, wherein the updated front view and the updated top view are generated from the front view data and top view data according to a second line-of-sight, and wherein the first line-of-sight and the second line-of-sight have a common origin. The method is particularly useful for visualising, for example, an open cut mine. An apparatus for working the method is also described.

25 Claims, 12 Drawing Sheets

(51) Int. Cl.
*G01S 7/20* (2006.01)
*G01S 7/51* (2006.01)
*G01S 7/295* (2006.01)
*G01S 7/18* (2006.01)
*G01C 11/02* (2006.01)
*G01S 13/86* (2006.01)

(52) U.S. Cl.
CPC ............... *G01S 7/295* (2013.01); *G01S 7/51* (2013.01); *G01S 13/867* (2013.01); *G01S 17/89* (2013.01)

(56) References Cited

U.S. PATENT DOCUMENTS

| | | | | |
|---|---|---|---|---|
| 8,453,060 | B2 * | 5/2013 | Ofek | G06F 16/9537 715/757 |
| 2008/0079723 | A1 * | 4/2008 | Hanson | G06K 9/0063 345/427 |
| 2008/0169963 | A1 * | 7/2008 | White | G01S 7/22 342/52 |
| 2009/0128399 | A1 * | 5/2009 | Root, Jr. | F41G 3/04 342/176 |
| 2009/0237396 | A1 * | 9/2009 | Venezia | G06T 19/00 345/419 |
| 2011/0001628 | A1 * | 1/2011 | Miyazawa | G01C 21/3664 340/686.1 |
| 2011/0007076 | A1 * | 1/2011 | Nielsen | G06F 17/30241 345/441 |
| 2013/0120182 | A1 * | 5/2013 | Noon | G01S 7/062 342/22 |
| 2013/0346916 | A1 * | 12/2013 | Williamson | G01C 21/3647 715/800 |
| 2014/0053077 | A1 * | 2/2014 | Unnikrishnan | G06F 3/04815 715/747 |

* cited by examiner

METHOD AND SYSTEM FOR DISPLAYING AN AREA

CROSS REFERENCE TO RELATED APPLICATION

This application is a national stage application of PCT/AU2014/050395, filed Dec. 3, 2014, which claims priority to Australian Patent Application No. 2013904705, filed Dec. 4, 2013, the disclosures of which are hereby incorporated by reference in their entirety.

FIELD OF THE INVENTION

The present invention relates to methods and systems for displaying an area, and in particular, although not exclusively, to methods and systems for displaying data relating to a mine wall.

BACKGROUND TO THE INVENTION

Slope stability is a critical safety and production issue for open cut mines, quarries, civil engineering works and the like. Major wall failures can occur seemingly without warning causing loss of lives, damage to equipment, significant disruption to the mining process.

Tell-tale signs of slope instability include the opening of cracks on the wall surface and crest, audible creaking, and increased rilling of spoil. It is difficult to interpret these signs to be able to distinguish between expected settling of recently excavated ground and events that will lead to catastrophic slope failure.

There are various slope monitoring systems employed by mine sites to monitor movement of slopes in order to provide an accurate reflection of the movement characteristics of the monitored slope. Such systems include the use of extensometers and laser electronic distance measurement to measure the dilation of cracks appearing on the crest or face of the slope. Geotechnical specialists can then interpret the pattern and history of movement to improve prediction of the failure process and to advise appropriate and timely stabilisation or safety management actions.

Almost all slopes exhibit a range of movement types prior to failure. These movement types include (based on T. D. Sullivan, "Understanding pit slope movements", Geotechnical Instrumentation and Monitoring in Open Pit and Underground Mining p 435-445, 1993):
1) regressive movements leading to stability,
2) progressive movements leading to collapse,
3) transitional movements which combine the regressive movements followed by progressive movements, and
4) stick slip which is a number of regressive/transgressive movements normally induced by an external influence such as rainfall, blasting or mining.

The Applicants have previously provided novel slope monitoring systems published under International Publication numbers WO 2002/046790 (Slope Monitoring System), WO 2007/012112 (Method And System Of Determining Alarm Conditions), WO 2012/100288 (Slope Stability Alarm) and WO2012/021923 (Work Area Monitor). The content of these three specifications are incorporated herein by reference.

On detection of an alarm condition at a particular area, a geotechnical specialist will generally manually analyse the area to further determine a risk. Manual analysis may also be performed in other circumstances.

However, a problem with manual analysis of the prior art is that it can be complex and prone to error. For example, it can be difficult to interpret radar data in the context of a mine, which can in turn result in either misinformed decisions, or inefficient utilisation of time.

Certain systems of the prior art provide tools to assist an operator in manually analysing radar data in the context of a mine. However such systems are complex, and generally do not enable intuitive analysis of data. As such, these systems are also prone to error. Furthermore, such systems typically require a surveyor to accurately determine a location of the radar, and translate the location to coordinates of the mine to enable integration of the radar data with models of the mine. Such processes are thus often very time consuming.

Accordingly, there is a need for improved methods and systems for displaying an area.

OBJECT OF THE INVENTION

It is an object of some embodiments of the present invention to provide improvements and advantages over the above described prior art, and/or overcome and alleviate one or more of the above described disadvantages of the prior art, and/or provide a useful commercial choice.

SUMMARY OF THE INVENTION

According to a first aspect, the invention resides in a method for displaying an area, the method including:
  receiving, on a data interface, front view data and top view data of the area;
  displaying, on a display device, a graphical user interface (GUI) including a front view of the area and a top view of the area, wherein the front view and the top view are generated from the front view data and the top view data according to a first line-of-sight;
  processing an interaction between an operator and one of the front view and the top view of the GUI; and
  displaying, on the display device, an updated GUI according to the interaction, wherein the updated GUI includes an updated front view of the area and an updated top view of the area, and wherein the updated front view and the updated top view are generated from the front view data and top view data according to a second line-of-sight, and wherein the first line-of-sight and the second line-of-sight have a common origin.

Preferably the front view data and top view data come from two or more sources.

Preferably, the updated front view comprises a translation of the front view, and the updated top view comprises a rotation of the top view.

The rotation of the top view may be a rotation in azimuth or a rotation in elevation. The translation in front view may be an up/down translation (corresponding to rotation of the top view in elevation) or a left/right translation (corresponding to rotation of the top view in azimuth).

Preferably, the updated front view and the updated top view are generated by maintaining a relationship between a translation of the front view and an angle of the top view.

Preferably, the front view comprises an azimuth range of data of the area laterally, and the top view comprises the azimuth range of the area rotationally.

Preferably, the interaction between the operator and the one of the front view and the top view comprises one of: rotating the top view; and translating the front view. Suitably, the interaction comprises dragging the top view around the common origin. The interaction may also include tilting the top view or front view around the common origin.

Preferably, the graphical user interface and the updated graphical user interface further include a line-of-sight element, for providing an illustration of the first line-of-sight and second line-of-sight respectively.

Preferably, the line-of-sight element is static in the graphical user interface and the updated graphical user interface, and the first line-of-sight and the second line-of-sight are illustrated by positions of the front view, top view, updated front view and updated top view relative to the line-of-sight element.

Suitably, the line-of-sight element is vertically aligned in the graphical user interface.

Preferably, the method further comprises aligning the top view data and the front view data.

Preferably, the front view data comprises image data, and the top view data comprises radar data. More preferably, the image data comprises image data of the visible light spectrum.

Preferably the image data comprises panoramic image data that is generated from a plurality of photographic images.

According to an alternative embodiment, one or more of the front view and top view data comprises laser scanner data, mine survey data, or a computer rendered model.

Preferably, the graphical user interface comprises a further top view, wherein one of the top view and the further top view is overlaid over the other of the top view and the further top view. Suitably, the further top view comprises an aerial photograph.

Preferably, the graphical user interface comprises an opacity interaction element, for defining an opacity of the one of the top view and the further top view that is overlaid over the other of the top view and the further top view.

Preferably, the graphical user interface includes an origin marker, illustrating the common origin.

Preferably, the graphical user interface comprises a zoom interaction element, for providing zoom functionality with respect to the front view and/or the top view.

According to a second aspect, the invention resides in a system for displaying an area including:

a data interface, for receiving front view data and top view data of the area;

a display device;

a processor coupled to the display device and the data interface, and a memory, coupled to the processor, the memory including instruction code executable by the processor for:

displaying, on the display device, a graphical user interface including a front view of the area and a top view of the area, wherein the front view and top view are generated from the front view data and top view data according to a first line-of-sight;

processing an interaction between an operator and one of the front view and the top view; and displaying, on the display device, an updated graphical user interface according to the interaction, the updated graphical user interface including an updated front view of the area and an updated top view of the area, wherein the updated front view and the updated top view are generated from the front view data and top view data according to a second line-of-sight.

Preferably, the system further includes:

a camera, coupled to the data interface, for capturing the front view data or the top view data; and a radar, coupled to the data interface, for capturing the top view data or the front view data.

Preferably, the camera and the radar are fixedly mounted to a frame. Suitably, fields of view of the camera and the radar are aligned.

According to a third aspect, the invention resides in a computer readable medium, including instructions executable by a processor for:

receiving, on a data interface, front view data and top view data of an area;

displaying, on a display device, a graphical user interface including a front view of the area and a top view of the area, wherein the front view and top view are generated from the front view data and top view data according to a first line-of-sight;

processing an interaction between an operator and one of the front view and the top view; and displaying, on the display device, an updated graphical user interface according to the interaction, the updated graphical user interface including an updated front view of the area and an updated top view of the area, wherein the updated front view and the updated top view are generated from the front view data and top view data according to a second line-of-sight.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
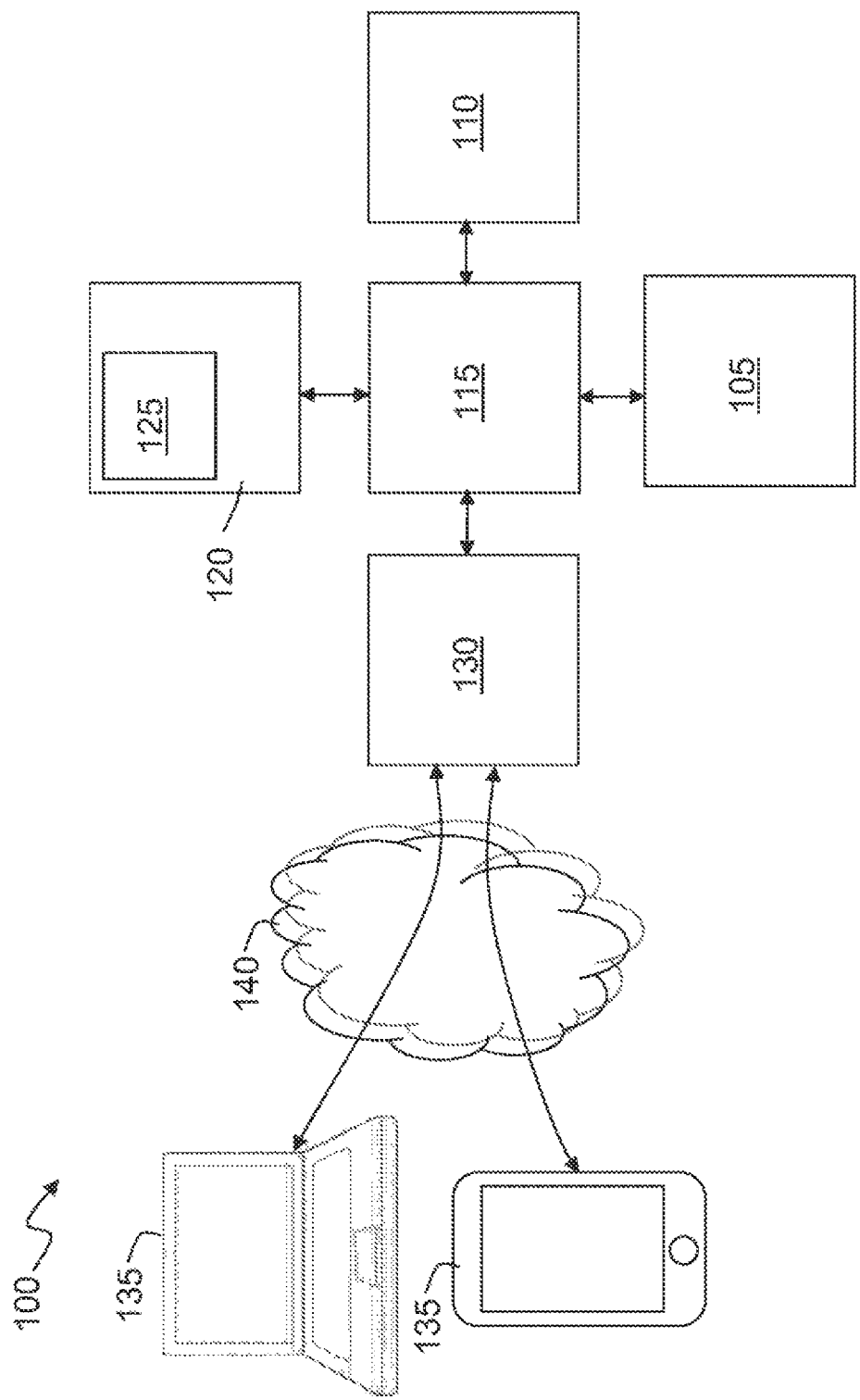
FIG. 1 illustrates a system for displaying an area, according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise methods and systems for mine safety visualisation. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a method for displaying an area, the method including:

receiving, on a data interface, front view data and top view data of the area;

displaying, on a display device, a graphical user interface including a front view of the area and a top view of the area, wherein the front view and top view are generated from the front view data and top view data according to a first line-of-sight;

processing an interaction between an operator and one of the front view and the top view; and displaying, on the display device, an updated graphical user interface according to the interaction, the updated graphical user interface including an updated front view of the area and an updated top view of the area, wherein the updated front view and the updated top view are generated from the front view data and top view data according to a second line-of-sight, and wherein the first line-of-sight and the second line-of-sight have a common origin.

Advantages of certain embodiments of the present invention include an ability to more intuitively view and interact with front view and top view data, and in particular radar and image data.

Further advantages of certain embodiments of the present invention include an ability to quickly and easily monitor an area, without requiring complex surveying or accurate digital terrain models (DTMs).

Yet a further advantage of certain embodiments of the present invention is the ability to efficiently and accurately analyse two-dimensional radar data in the context of a three dimensional model.

Still another advantage of certain embodiments of the present invention is that an operator can quickly and efficiently analyse an area remotely. Thus relatively unskilled workers, e.g. workers without formal surveying experience, are able to configure the system on-site for capture of data, which data is then sent to the remote location.

FIG. 1 illustrates a system 100 for displaying an area, according to an embodiment of the present invention. An example of an area is an open cut mine, but the skilled addressee will readily appreciate that the system 100 can be adapted to suit various other types of areas, including underground mines, construction sites, cityscapes, ports, monuments, dams, roads, embankments, and the like. The system may also be applicable to non-static applications such as guiding a ship into harbour where the bridge is the common origin, the top view displays the harbour depths and the front view displays the view from the bridge. The line-of-site will change with the direction of the ship.

The system 100 includes a radar module 105, an image capture device 110, a processor 115 and a memory 120. The radar module 105 and the image capture device 110 are coupled to the processor 115, generally by a data interface (not shown) and are for capturing radar data and image data of the area. The radar module 105 and the image capture device 110 are advantageously fixedly mounted to a platform (not shown) such that a field of view of the radar module 105 and a field of view of the image capture device 110 are overlapping.

The memory 120 is also coupled to the processor 115 and includes computer readable instruction code 125 for receiving the radar and image data, and generating an interactive graphical user interface including the radar and image data, as discussed further below.

The system 100 includes a network interface 130, coupled to the processor 115, for providing the interactive graphical user interface to one or more visualisation devices 135. This is performed over a suitable data communications network 140, such as a near field communications network, a private network, or a public network such as the Internet.

The visualisation devices 135, while for example being depicted as a laptop and a smart phone, can comprise a personal computer, a tablet computer, a mobile phone, a digital assistant, an internet enabled device running a web-browser, or any other suitable device. Furthermore, one or more of the visualisation devices 135 can be purpose built devices.

The visualisation devices 135 can, for example, be located at a central office, or other suitable location, such that the radar and image data can be captured at a first location, and analysed at a second location. This can be particularly useful when an area is potentially unsafe for people to enter.

According to alternative embodiments (not shown), a display device is coupled to the processor 115 for displaying the interactive graphical user interface. This is particularly useful when a standalone system is required, such as a system mounted to a utility vehicle, trailer or the like.

The processor 115, the data interface 105 and the memory 120 can reside on a single server (not shown), or be part of several computing devices operating in a distributed manner (again not shown), such as a virtual computing device operating in a server cloud.

The system 100 enables visualisation of, for example, mine data, by linking front-view sensor image data (e.g.

panoramic image data or a perspective view) and top-view data (e.g. a radar image) in an intuitive way. In particular, an interactive slide and rotate mechanism and an eye-line provides a visual link between corresponding portions of the front-view sensor image and the top view image.

The front view image data advantageously comprises panoramic or perspective image data, which can, for example, provide a 180 degree or up to a 360 degree view from a location of the capture device 110. The panoramic image data can be generated by rotating the image capture device 110 and joining a plurality of images, or by using a specialised lens, as is well understood in the art.

As discussed further below, geo-referencing techniques can be used to overlay and align radar data with other external data sources, such as aerial photographs, topographical maps, mine plans, satellite images, and DTMs, to enhance spatial orientation and/or simplify interpretation of radar data.

The following description focuses on camera images of the visible light spectrum and radar data, but the skilled addressee will readily appreciate that the system 100 can be adapted to be used with non-radar and/or non-image data, such as laser scanner data, infrared image data, hyperspectral image data, computer generated data, or the like.

Similarly, the front view image data refers to data that can be used to generate a two or three-dimensional front view projection or a perspective view of the mine and the top-view image data refers to data that can be used to generate a two or three-dimensional top-view projection of the mine. The top-view image data does not need to be data captured from above and can, for example, comprise plan radar data captured using a radar located at or near ground level.

Furthermore, the top view data and the front view data may come from a single data source, although it will be more usual for there to be two or more sources of data. It should also be clear that top view data can be derived from what may be considered a front view source and vice versa.

FIGS. 2-9 illustrate different aspects of the system 100 from a perspective of a visualisation device 135.

Figure 2:
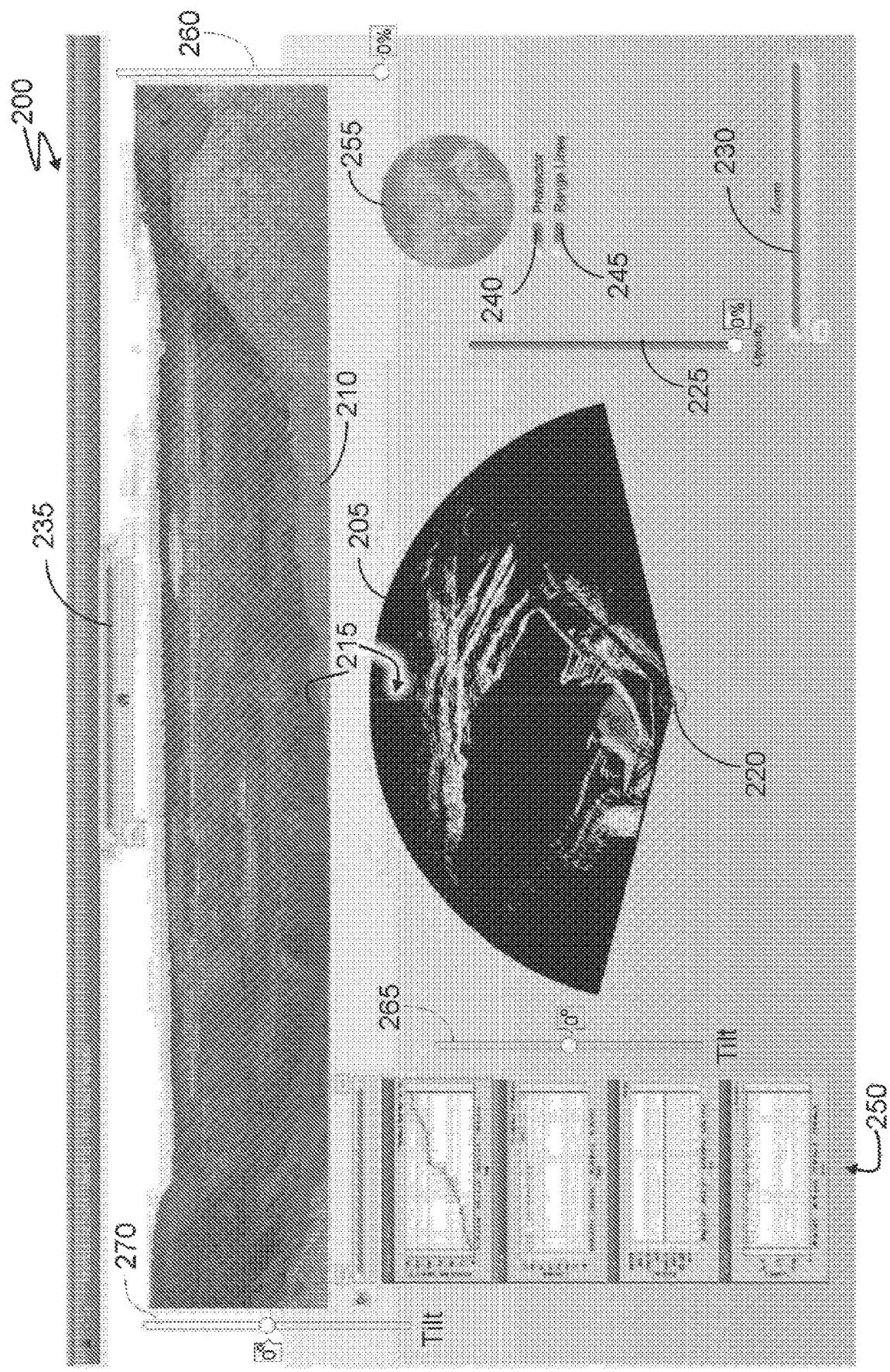
FIG. 2 illustrates a screenshot of an area visualisation page of the system of FIG. 1, according to an embodiment of the present invention.

FIG. 2 illustrates a screenshot 200 of an area visualisation page of the system 100, according to an embodiment of the present invention. The area visualisation page can be used by an operator to visualise radar and image data of an open cut mine in an intuitive way by linking panoramic image data of the open cut mine with radar data of the open cut mine.

The area visualisation page includes a top view component 205, a front view component 210 and a line-of-sight element 215, providing a link between the top view component 205 and the front view component 210.

The top view component 205 comprises a top view of the open cut mine as captured by the radar module 105. The radar module 105 can, for example, comprise a radar beam that is directed towards the open cut mine. The top view component 205 illustrates radar data generated from a single point and in a fan-like shape. The fan-like shape corresponds to a broad angle azimuth spread of approximately 150 degrees and can be achieved, for example, through rotation of the radar module 105. The broad angle azimuth spread can be greater than 150 degrees and including 360 degrees.

The front view component 210 comprises a front view of the open cut mine, captured using the image capture device 110, which is located at substantially the same location as the radar module 105. The front view component 210 corresponds to a same field of view as the top view component 205. As such, the front view component 210 and the top view component 205 have a common origin.

The skilled addressee will, however, readily appreciate that the image capture device 110 need not be located at the same location as the radar module 105. In such case, the front view component 210 and the top view component 205 can, for example, be rendered from a common virtual origin using known view synthesis methods.

The line-of-sight element 215 is a straight line extending through the top view component 205 and the front view component 210. The line-of-sight element 215 defines an azimuth angle over the top view component 205 from an origin point 220, and a line in the front view component 210 corresponding to the azimuth angle over the top view component 205.

The skilled addressee will, however, readily appreciate that the line-of-sight element 215 can be represented separately in the top view component 205 and the front view component 210, and by means other than a straight line.

The line-of-sight element 215 enables an operator to quickly identify an object in the front view component 210 based upon an identified object in the top view component 205, or vice versa. As such, the system 100 enables an operator to quickly identify potential problems in a wall of an open cut mine for further review, or quickly discard false positive alarms caused by storms, rainwater, moving vehicles, or the like.

The system 100 can further include elements that map points or regions of the front view component 210 to points or regions of the top view component 205, or vice versa. For example, an operator can select a region of the top view component 205 which is highlighted in the front view component 210.

In particular, a cursor location in the top view component 205 can be highlighted in the front view component 210, or vice versa. Similarly, a region of the top view component 205 can be selected, for example a triggered alarm area in the top view component 205, which is highlighted in the front view component 210 as the same triggered alarm area.

The top view component 205 and the front view component 210 are interactive and can be moved by the operator. According to certain embodiments, at least one of the top view component 205 and the front view component 210 can be "dragged" by the operator, upon which the other of the top view component 205 and the front view component 210 is automatically moved. As will be readily understood by the skilled addressee, dragging an object is one example of interacting with a graphical user interface, and any other suitable interaction means can be used by the operator to move an object, including interacting with keys of a keyboard, with a joystick, a touch screen, by interacting with motion sensors, voice commands, or the like.

The top view component 205 can be rotated around the origin point 220. As discussed in further detail below, the front view component 210 is then moved laterally such that the line-of-sight element 215 defines corresponding areas of the top view component 205 and the front view component 210.

Various other elements of the GUI include opacity bars 225 and 260, zoom bars 230 and 235, protractor toggle bar 240, range lines toggle bar 245, chart 250, overview image 255, and tilt bars 265 and 270. The chart 250 may include a time slider (shown at top of charts 250) to adjust the timescale for display of data in the chart 250. The time slider may be used to select a top view and a front view at a given time. That is to say, moving of the time slider adjusts the chart 250 but also changes the front view and top view to be the appropriate views for the time location of the time slider.

The tilt bars 265 and 270 are used by the Operator to tilt either the front view or the top view. In order to maintain the intuitive link between the front view and the top view the tilting of one may result in a corresponding tilt, shift or rotation of the other. The tilting occurs around the common origin. As will be readily understood by the skilled addressee, these elements may be activated or interacted with by other means such as icons, menus, mouse movements and the like.

Figure 3:
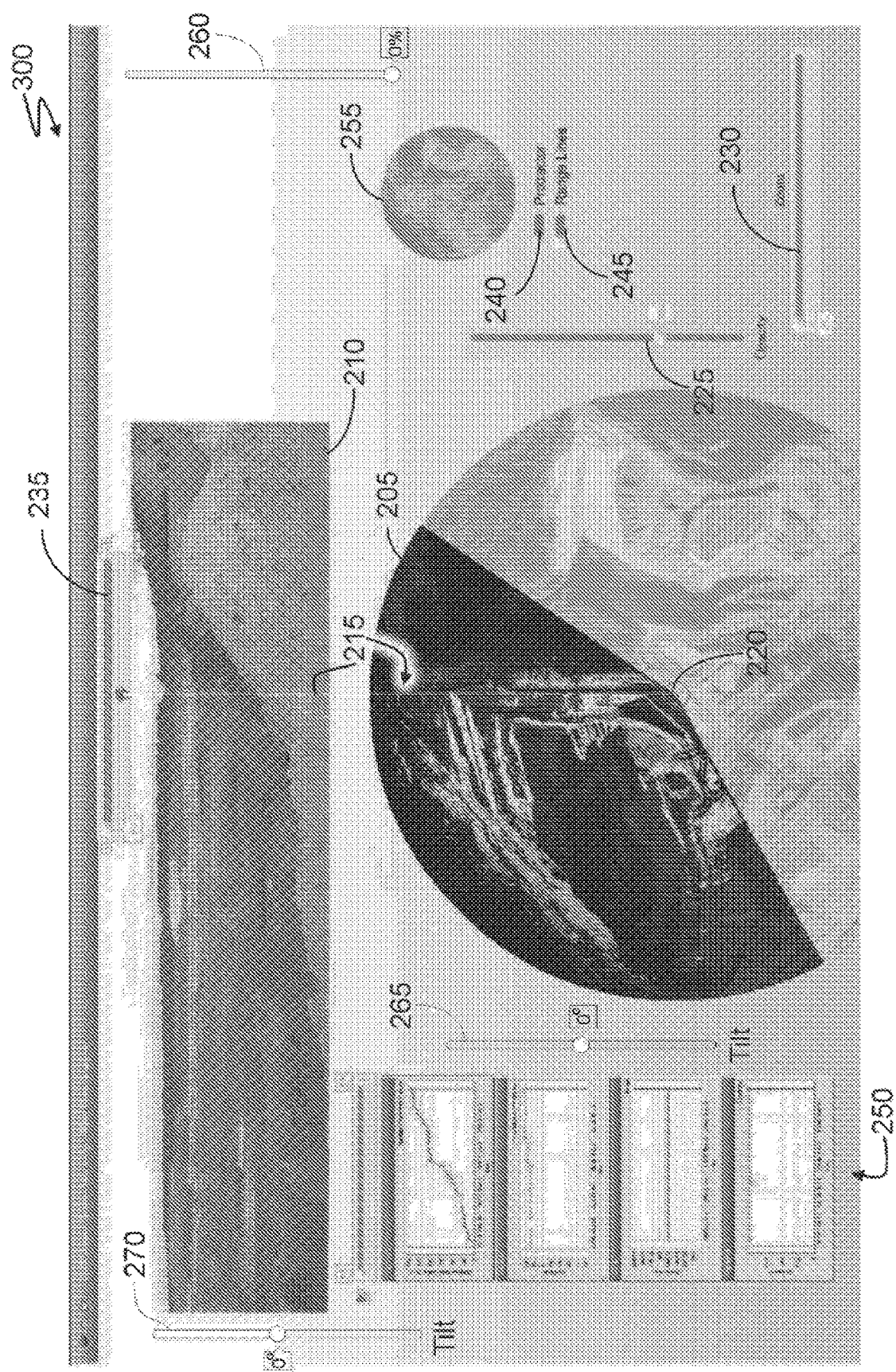
FIG. 3 illustrates a further screenshot of the area visualisation page of FIG. 2, wherein radar data of a top view component has been dragged in an anti-clockwise direction.

FIG. 3 illustrates a screenshot 300 of the area visualisation page of the system 100, wherein the radar data of the top view component 205 has been dragged in an anti-clockwise direction, and the image data of the front view component 210 has correspondingly been moved to the left.

The top view component 205 and the front view component 210 are generated from the front view data and top view data according to a same line-of-sight. When an operator drags the top view component 205 the line-of-sight changes, which results in both the top view component 205 and the front view component 210 being rendered using the new line-of-sight. Accordingly, any rotation of the radar data results in a lateral movement of the front image data, and vice versa.

In order to maintain an intuitive link between the top view component 205 and the front view component 210, the line-of-sight element 215 remains static during interaction with the operator. As such, the radar data of the top view component 205 and the front image data of the front view component 210 are rotated and translated around and past the line-of-sight element 215.

As discussed in further detail below, the top view component 205 can comprise a combination of radar data and other top-view image data. The top-view image data can, for example, comprise satellite image data, an aerial photograph, a topographical map, a plan, a rendered DTM, or the like, and can be used to simplify interpretation of the radar data.

The area visualisation page includes an opacity bar 225, for defining an opacity of the radar data of the top view component 205 with respect to top-view image data. The opacity bar defines how much of each of the radar data and other top-view image data can be seen in the top view component 205. This can be implemented by, for example, overlaying the radar data over the top-view image data and modifying a transparency (alpha) value of the radar data, or by overlaying the top-view image data over the radar data and modifying a transparency (alpha) value of the top-view image data.

The skilled addressee will readily appreciate that any suitable image layering system can be used to illustrate a relationship between the radar data and other top-view image data. Furthermore, several layers of data can be layered, for example by using colour coding. Likewise, front view layers and annotations are possible.

Figure 4:
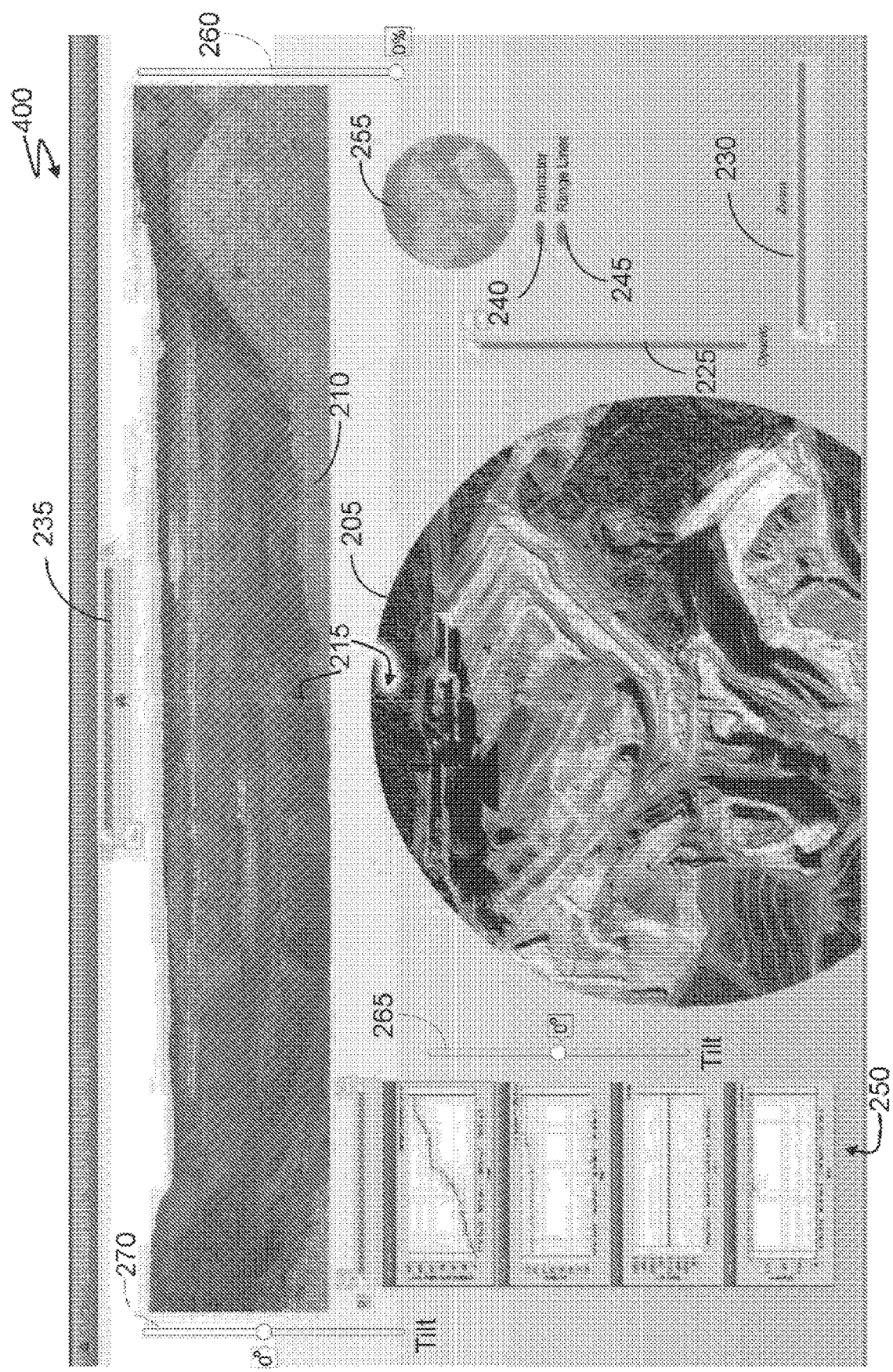
FIG. 4 illustrates a further screenshot of the area visualisation page of FIG. 2, wherein an opacity bar has been used to render image data of the top view component fully opaque.
Figure 5:
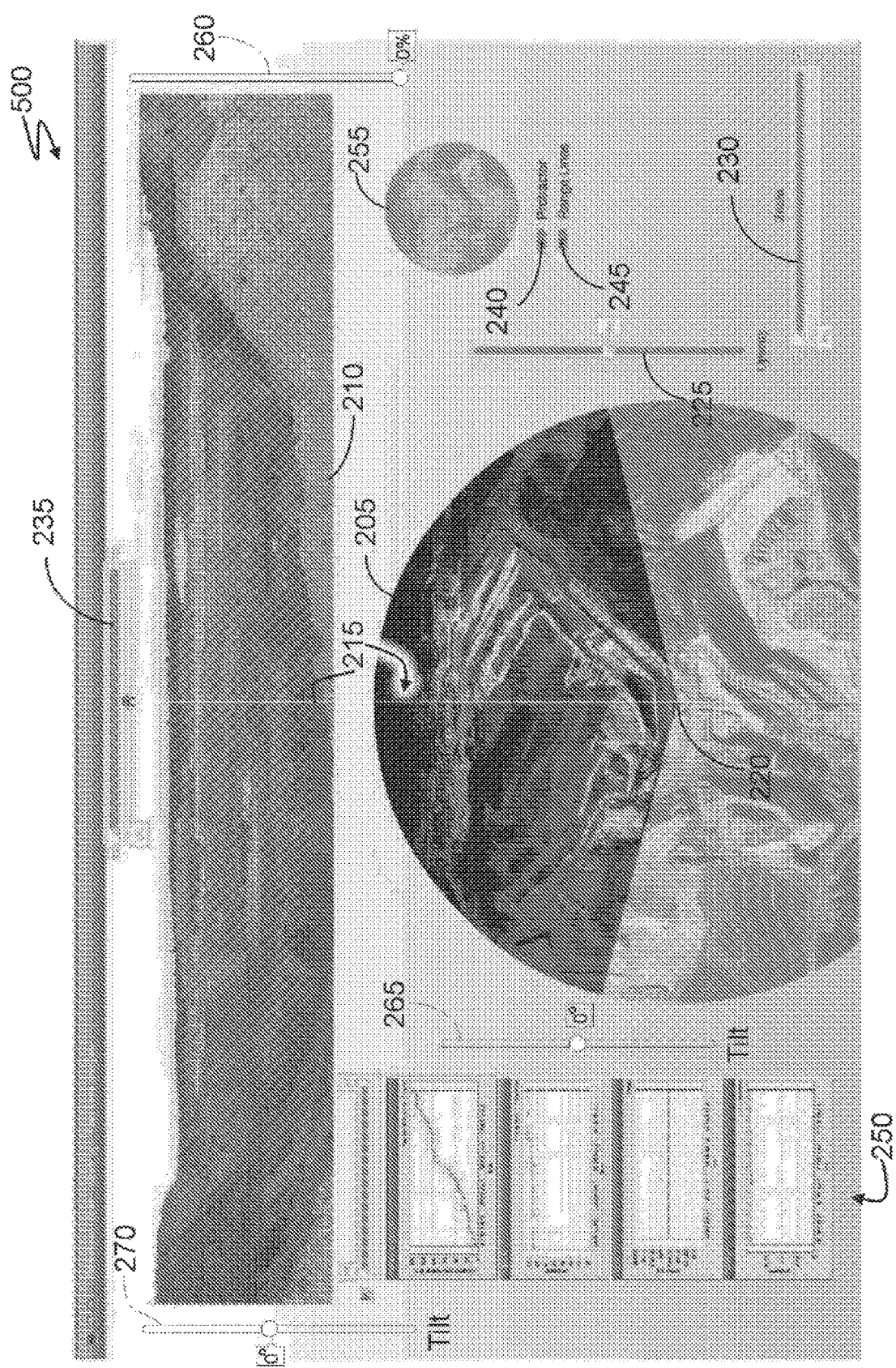
FIG. 5 illustrates a further screenshot of the area visualisation page of FIG. 2, wherein the opacity bar has been used to render image data of the top view component partially opaque.

FIG. 4 illustrates a screenshot 400 of the area visualisation page of the system 100, wherein the opacity bar 225 has been used to render the image data of the top view component 205 fully opaque. In other words, the top-view image data is fully visible in the top view component 205. FIG. 5 illustrates a screenshot 500 of the area visualisation page of the system 100, wherein the opacity bar 225 has been used to render the image data of the top view component 205 partially opaque. In other words, both the top-view image data and the radar data are visible in the top view component 205.

As the radar data has been generated from a single point near ground level, and whereas the top-view image data has been generated from above, certain aspects of the open-cut mine will not be visible from one or the other of the radar data and the top-view image data. For example, a vertical drop will not necessarily be visible in a top view image, although such a vertical drop will be clearly visible in the radar image as a wall.

Also, inconsistencies or distortions between the radar data and the top-view image data may be present, as the radar data may not represent a true top view. For example, a radar beam will measure horizontally, or diagonally due to the beam-like nature of the radar. Such inconsistencies or distortions may be corrected but need not be corrected, as in many scenarios the distortion is sufficiently low as to not interfere with analysis of the data.

By switching between the radar data and the top-view image data using the opacity bar 225, and in particular rendering the radar data together with the top-view image data, the operator is able to more efficiently visualise the area from above, and identify specific objects such as roads, etc, which may not be visible in one of the radar data and the top-view image data.

A radar zoom bar 230 can be used to zoom the top view component 205, and a front image zoom bar 235 can be used to zoom the front view component 210, as discussed below.

Figure 6:
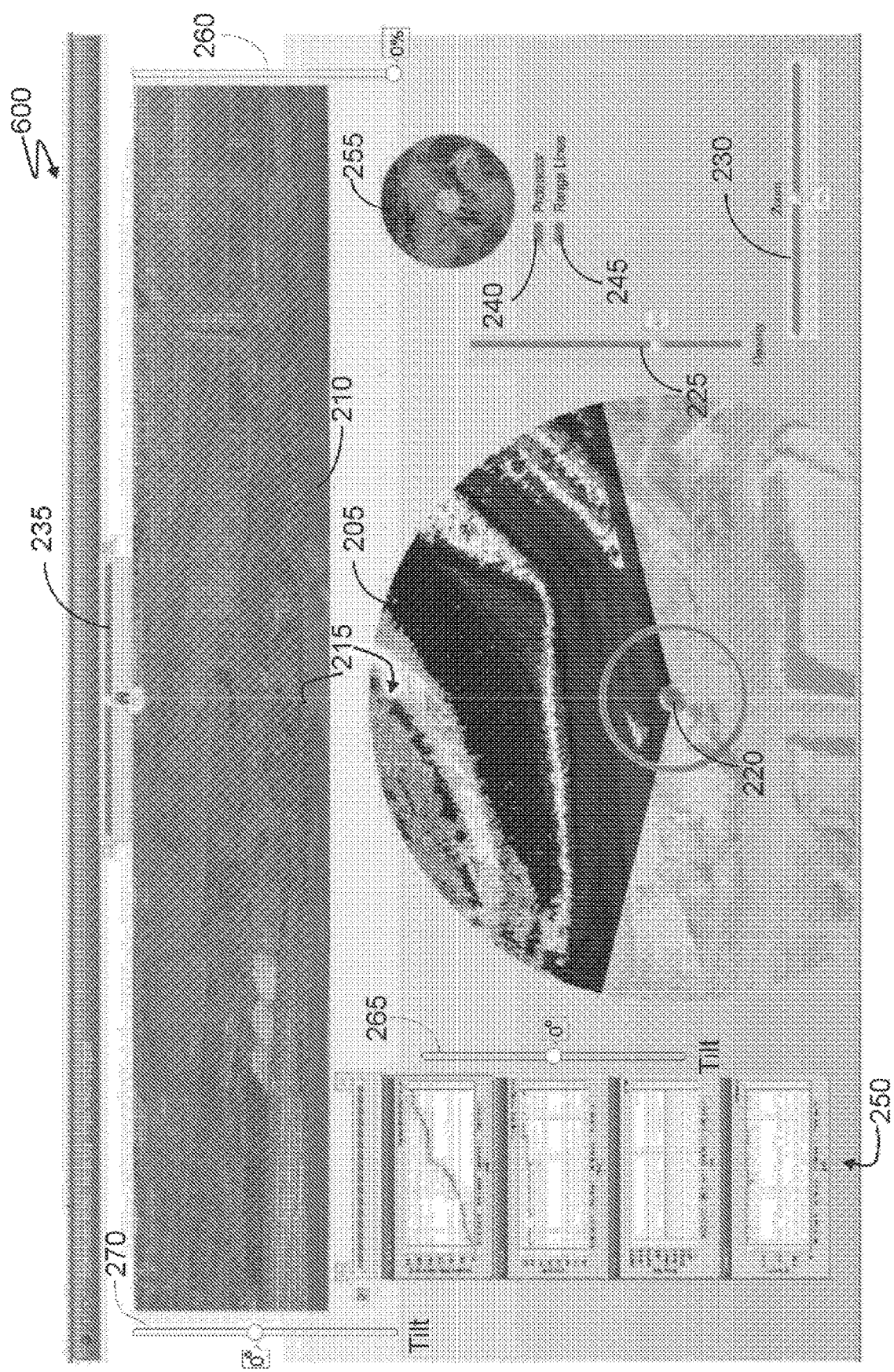
FIG. 6 illustrates a further screenshot of the area visualisation page of FIG. 2, wherein a radar zoom bar has been used to zoom the top view component.

FIG. 6 illustrates a screenshot 600 of the area visualisation page of the system 100, wherein the radar zoom bar 230 has been used to zoom in on the top view component 205.

Figure 7:
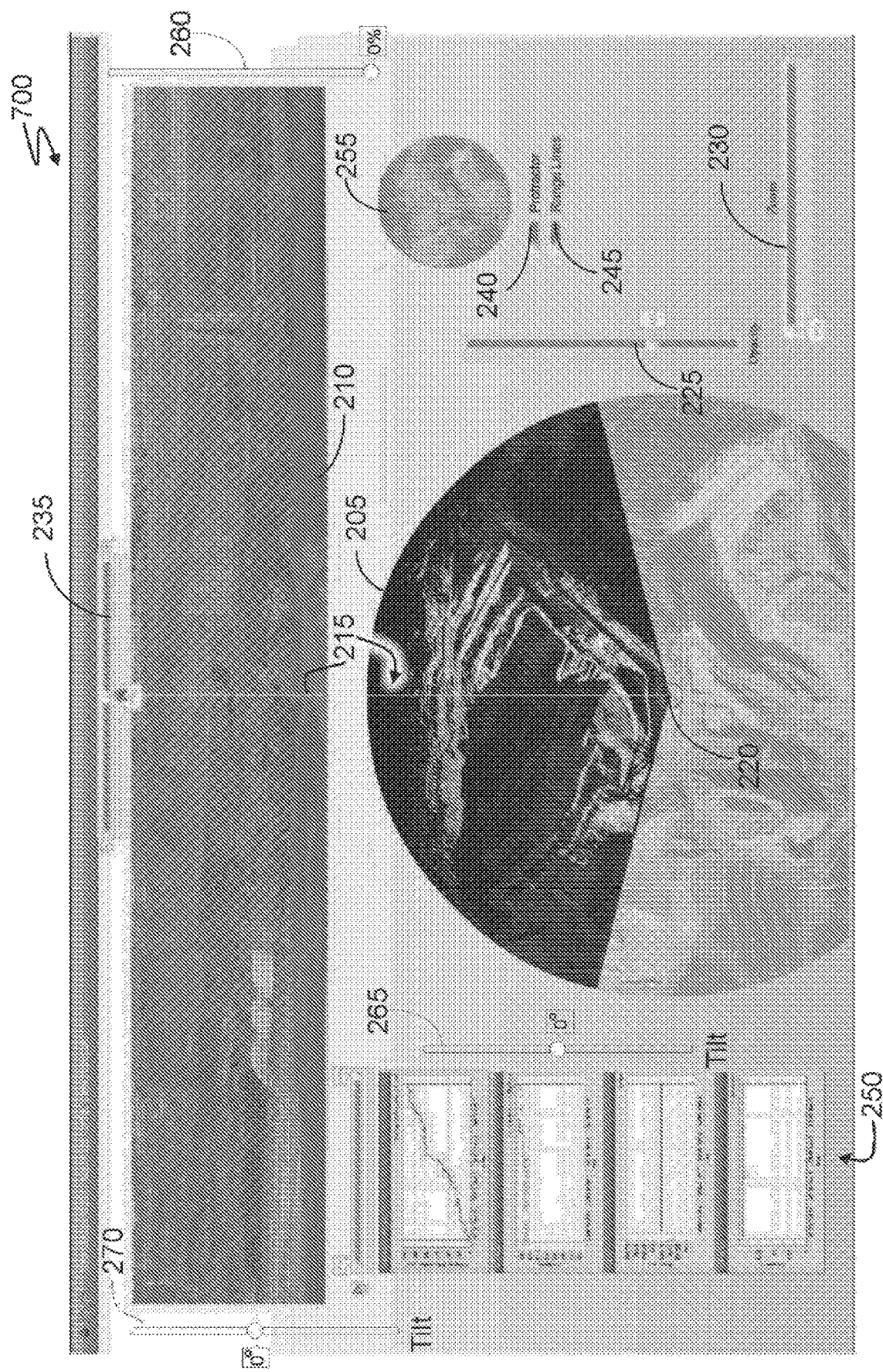
FIG. 7 illustrates a further screenshot of the area visualisation page of FIG. 2, wherein a front image zoom bar has been used to zoom a front view component.

The top view component 205 is zoomed around the origin point 220, which is particularly useful when detailed analysis of an object in the top view component 205 is required. According to certain embodiments, the top view component 205, when zoomed, can be dragged along the line-of-sight element 215. This enables the operator to zoom in on objects, regardless of where they are located in the top view component 205, without breaking the intuitive link between the top view component 205 and the front view component 210. In FIG. 6 the top view component 205 and the front view component 210 are shown as zooming together, but this is not necessary. As seen in FIG. 7 the views may be zoomed independently.

FIG. 7 illustrates a screenshot 700 of the area visualisation page of the system 100, wherein the front image zoom bar 235 has been used to zoom the front view component 210.

The front view component 210 is zoomed around the line-of-sight element 215. According to certain embodiments, the front view component 210, when zoomed, can be dragged in any direction. When dragged laterally, the top view component 205 is rotated, but when dragged vertically, the top view component 205 is not changed.

According to certain embodiments, the top view component 205 and the front view component 210 can be scaled/zoomed independently of each other. This enables the operator to analyse a particular feature in the top view component 205, while maintaining a broad overview of the mine in the front view component 210.

A protractor toggle bar 240 can be used to provide protractor lines on the top view component 205, and a range lines toggle bar 245 can be used to provide range lines on the top view component 205.

Figure 8:
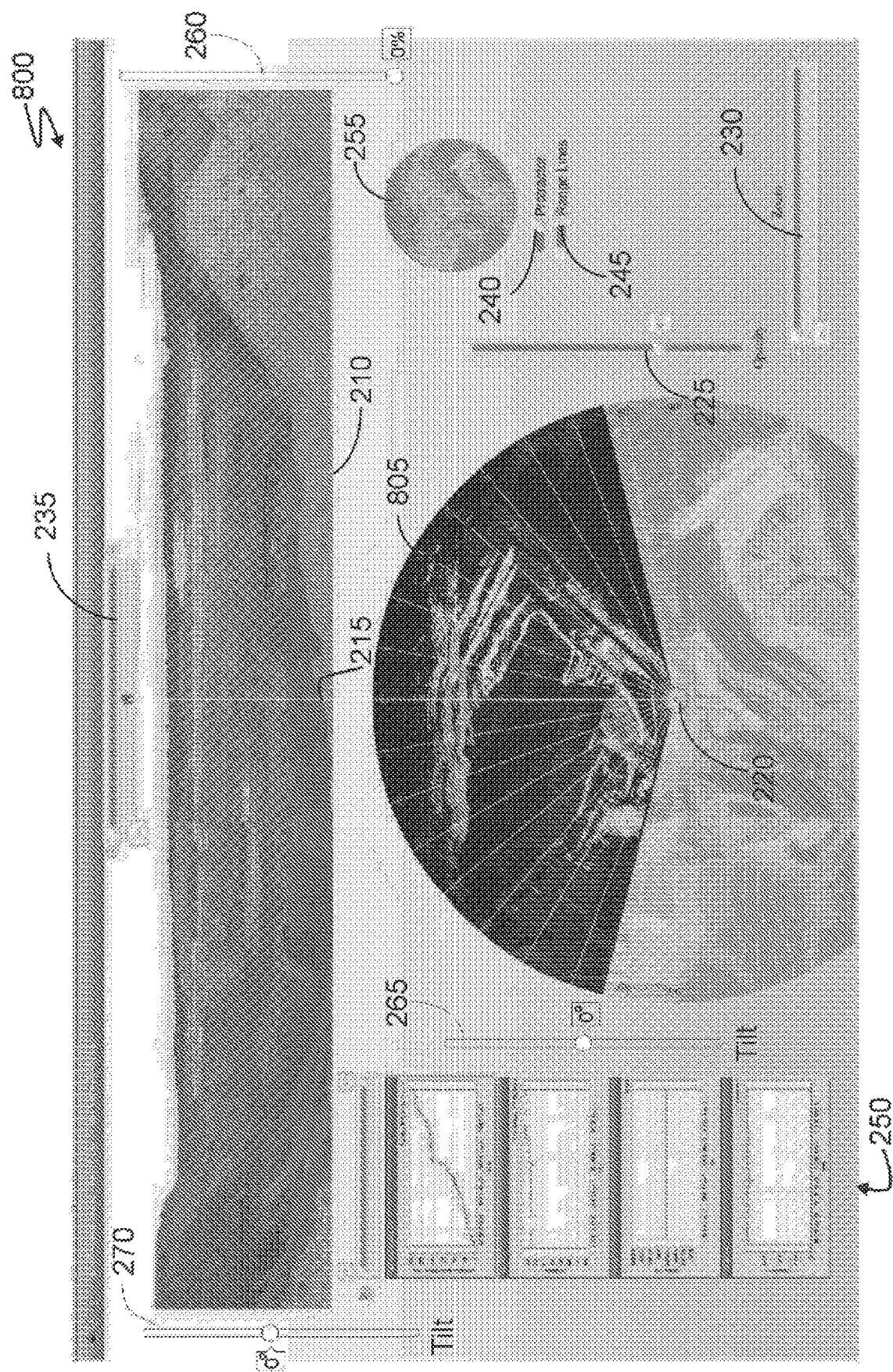
FIG. 8 illustrates a further screenshot of the area visualisation page of FIG. 2, wherein a protractor toggle bar has been used to render protractor lines on the top view component.

FIG. 8 illustrates a screenshot 800 of the area visualisation page of the system 100, wherein the protractor toggle bar 240 has been used to render protractor lines 805 on the top view component 205. The protractor lines 805 show angles with reference to the line of sight line 215. The protractor lines 805 can be used to assist an operator in interpretation of the radar data, by providing an efficient means of interpreting distance in the area.

Figure 9:
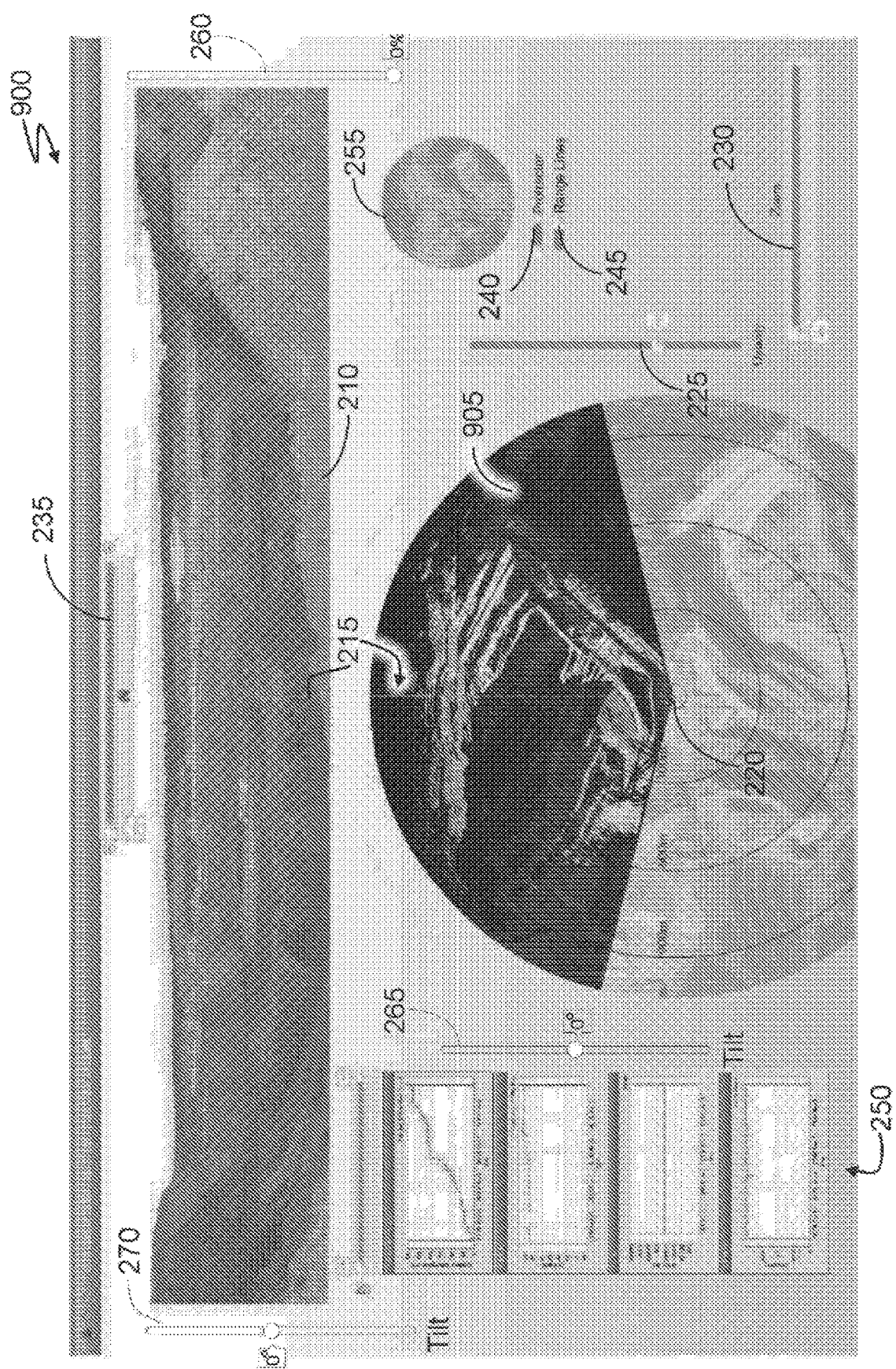
FIG. 9 illustrates a further screenshot of the area visualisation page of FIG. 2, wherein a range lines toggle bar has been used to render range lines on the top view component.

FIG. 9 illustrates a screenshot 900 of the area visualisation page of the system 100, wherein the range lines toggle bar 245 has been used to render range lines 905 on the top view component 205. The iso-range lines 905 show a distance from the origin 220. In a similar manner to the protractor lines 805, the range lines 905 can be used to assist an operator in interpretation of the radar data.

The area visualisation page further includes a plurality of charts 250, providing information relating to an aspect of the mine. For example, a chart 250 can plot movement of a region of interest of the mine over time, and such region of interest can be selected by the operator. As will be readily understood by the skilled addressee, a region of interest can, for example, be selected by clicking on a portion of the top view component 205.

The area visualisation page includes an overview image 255. The overview image 255 can comprise an aerial image, and can be used in providing an overview of the mine, but also illustrate a level of zoom when zooming or navigating in the top view component 205, as discussed above.

According to certain embodiments, geo-referencing of the radar and image data can be performed, in which survey techniques are used to get an accurate location and orientation for the system 100. In such case, data generated by the system 100 can be transformed into a coordinate system of the mine.

For three-dimensional radar data, such as data of the GroundProbe Slope Stability Radar SSR-XT, the radar data can be transformed directly into mine coordinates. In such case, the three-dimensional radar coordinates are transformed from a coordinate system of the radar, to a coordinate system of the mine using methods well known in the art.

For two-dimensional radar data, such as data of the GroundProbe Slope Stability Radar SSR-FX, a range to elevation mapping function can be used to transform the radar data into the coordinate system of the mine. In such case, radar data is projected onto a wall surface of three dimensional mine data, herein referred to as 'draping'. The two dimensional radar data is thus transformed into three-dimensions, and can then also be mapped to the front view component 210 in both azimuth and elevation.

The draping process also enables the radar data of the top view component 205 to be better aligned with an aerial photograph, as distortion caused by elevation can be compensated for. In such case, the radar data can be projected from draped 3D mine data onto a 2D surface.

Finally, the area visualisation page includes a front view opacity bar 260, for defining an opacity of the image data of the front view component 210 with respect to further front view data, such as front radar data. The opacity bar 260 defines how much of each of the front view data and further front view data can be seen in the front view component 210.

This enables a user to focus on a combination of radar and image data in both the front view component 210 and the top view component 205, which in turn simplifies analysis of the image and radar data.

Figure 10A:
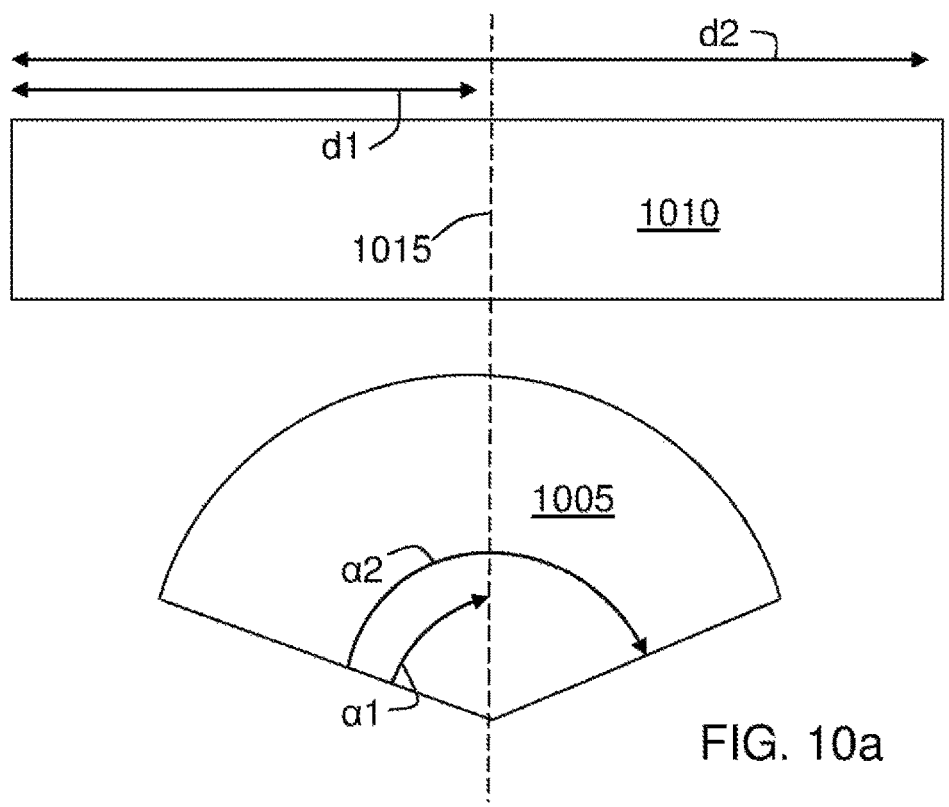
FIG. 10a diagrammatically illustrates a relationship between a top view component and a front view component of a system, wherein the top view component is centrally aligned with respect to the line-of-sight element, according to an embodiment of the present invention.
Figure 10B:
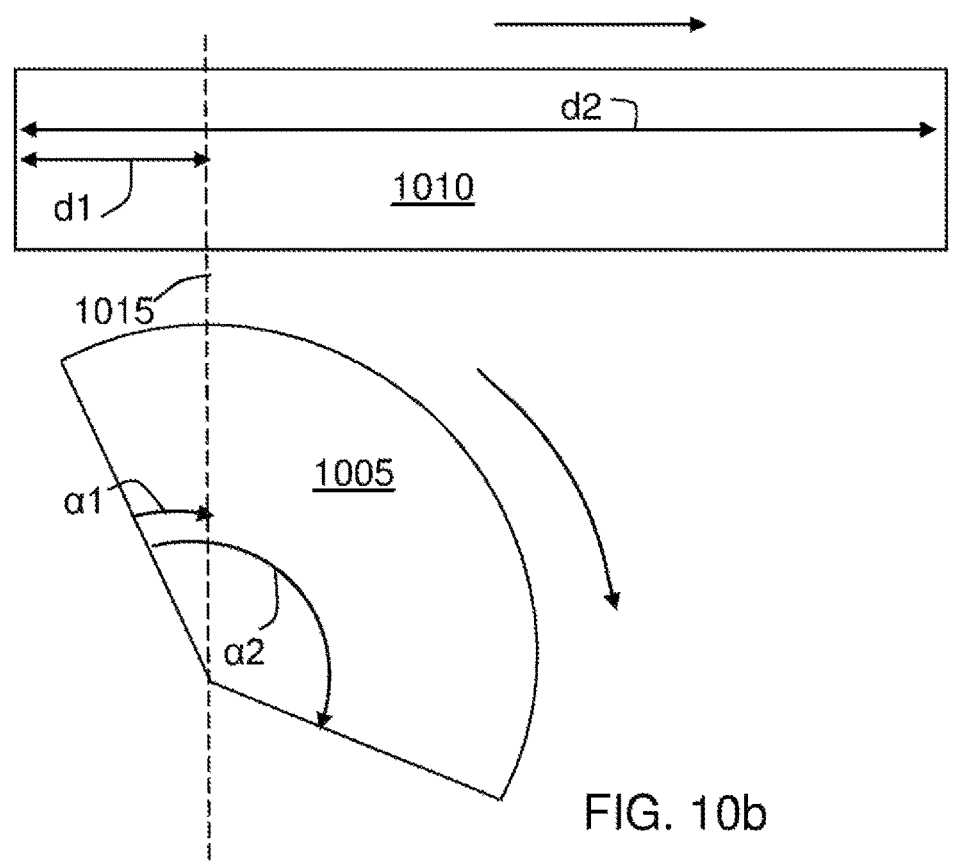
FIG. 10b further illustrates the relationship of FIG. 10a, wherein the top view component is rotated to the right with respect to the line-of-sight element.

FIG. 10a and FIG. 10b diagrammatically illustrate a relationship between a top view component 1005 and a front view component 1010 of a system 1000, according to an embodiment of the present invention. The top view component 1005 and a front view component 1010 can be similar or identical to the top view component 205 and the front view component 210.

FIG. 10a illustrates top view data of the top view component 1005 centrally aligned with respect to a line-of-sight element 1015, and accordingly a front view component 1010 centrally aligned with respect to the line-of-sight element 1015.

The top view component 1005 and the front view component 210 correspond to equal ranges of view in the azimuth direction. As such, a leftmost position of the top view component 1005 corresponds to a leftmost position of the front view component 1010 and a rightmost position of the top view component 1005 corresponds to a rightmost position of the front view component 1010.

A horizontal length ratio of the front view component 1010 is defined by a ratio of a left portion length d1 of the front view component 1010 to a total length d2 of the front view component 1010. Similarly, an angle ratio is defined by a ratio of a left portion azimuth angle α1 of the top view component 205 to a total azimuth range α2 of the top view component 205.

The front view data of the front view component 1010 and the top view data of the top view component 1005 are then aligned by maintaining a relationship between the horizontal length ratio and the angle ratio of the front image data and the radar respectively. In particular, the following relationship is maintained:

$$\frac{d1}{d2} = \frac{\alpha 1}{\alpha 2} \qquad \text{(Equation 1)}$$

FIG. 10b illustrates the top view component 1005 rotated to the right with respect to the line-of-sight element 1005, and accordingly the front view component 1010 translated to the right with respect to the line-of-sight element 1005.

Restrictions regarding how an operator is able to interact with the top view component 1005 and the front view component 1010 help maintain the intuitive link between the top view component 1005 and the front view component 1010. However, the skilled addressee will readily appreciate that the system 1000 need not have such restrictions. In particular, if sufficient three-dimensional data is available, a system, such as the system 100 or the system 1000, could allow an operator to pivot the radar data up and down, while at the same time changing the front view image data accordingly.

Figure 11:
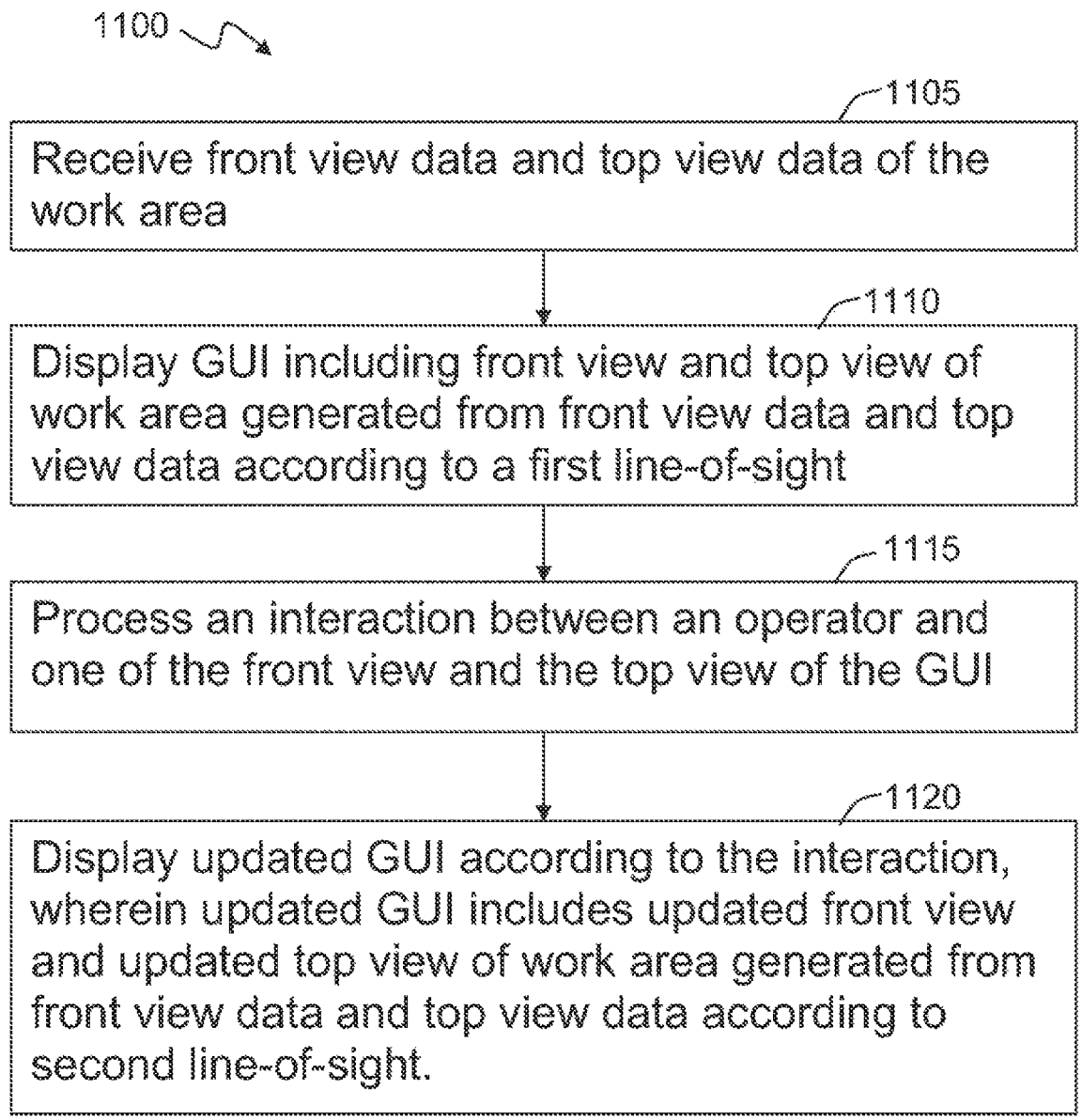
FIG. 11 illustrates a method for displaying an area, according to an embodiment of the present invention.

FIG. 11 illustrates a method 1100 for displaying an area, according to an embodiment of the present invention.

At step 1105, front view data and top view data of the area is received on a data interface. The data interface can comprise, for example, an interface to a camera and radar device, such as a universal serial bus (USB interface), or a network interface on which the front view data and top view data is received by a network.

At step 1110, a graphical user interface is displayed on a display device. The graphical user interface includes a front view of the area and a top view of the area. The front view and top view are generated from the front view data and top view data according to a first line-of-sight.

At step 1115, an interaction between an operator and one of the front view and the top view is processed. The interaction can, for example, comprise dragging the front or top view, or any other suitable interaction.

At step 1120, an updated graphical user interface is displayed on the display device according to the interaction. The updated graphical user interface includes an updated front view of the area and an updated top view of the area, wherein the updated front view and the updated top view are generated from the front view data and top view data according to a second line-of-sight.

Figure 12:
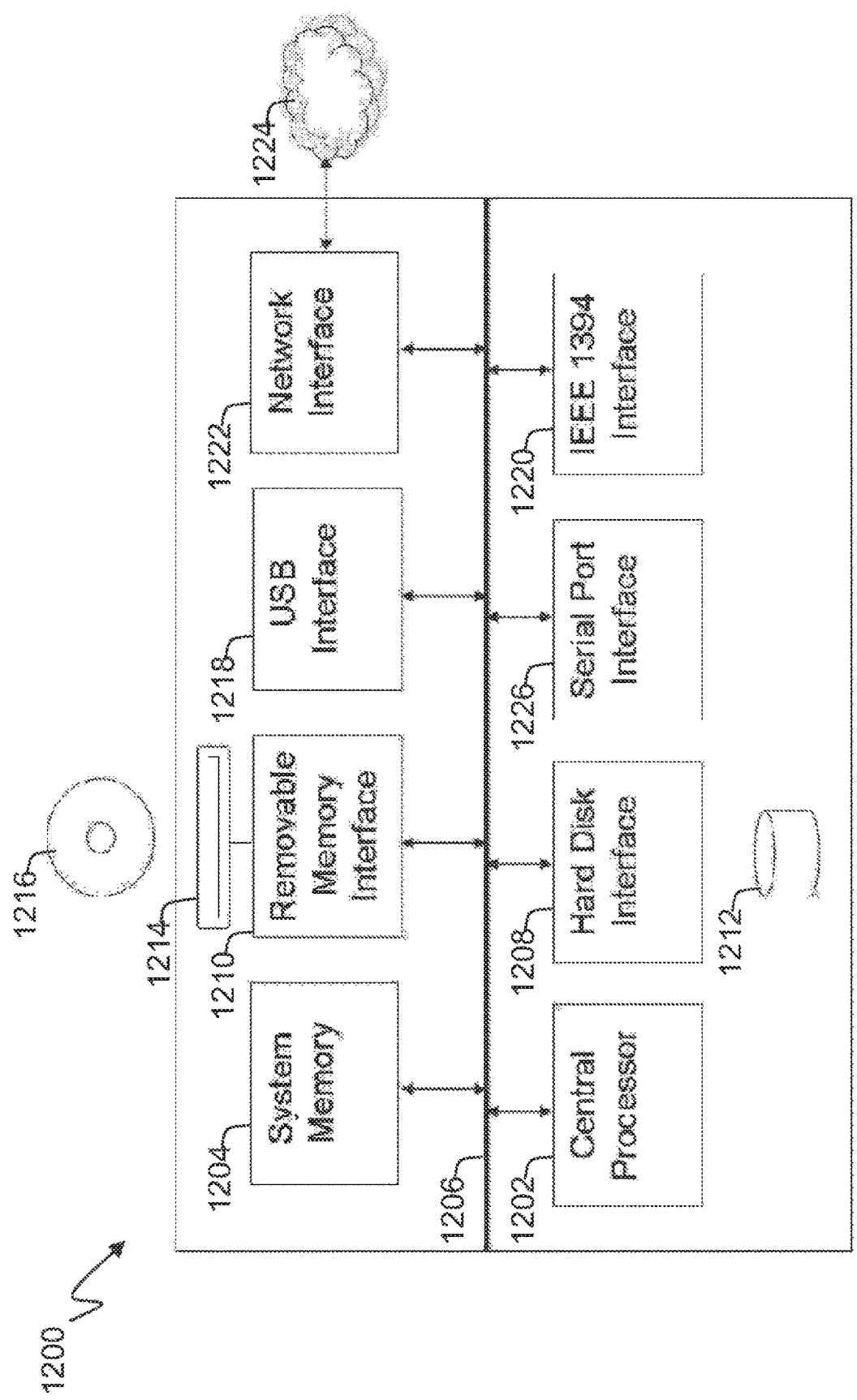
FIG. 12 diagrammatically illustrates a computing device, according to an embodiment of the present invention.

FIG. 12 diagrammatically illustrates a computing device 1200, according to an embodiment of the present invention. The system 100 of FIG. 1 can be implemented at least partially using the computing device 1200. Similarly, the method 1100 of FIG. 11 can be implemented using the computing device 1200.

The computing device 1200 includes a central processor 1202, a system memory 1204 and a system bus 1206 that couples various system components, including coupling the system memory 1204 to the central processor 1202. The system bus 1206 may be any of several types of bus structures including a memory bus or memory controller, a peripheral bus, and a local bus using any of a variety of bus architectures. The structure of system memory 1204 is well known to those skilled in the art and may include a basic input/output system (BIOS) stored in a read only memory (ROM) and one or more program modules such as operating systems, application programs and program data stored in random access memory (RAM).

The computing device 1200 can also include a variety of interface units and drives for reading and writing data. The data can include, for example, radar or image data, as discussed above.

In particular, the computing device 1200 includes a hard disk interface 1208 and a removable memory interface 1210, respectively coupling a hard disk drive 1212 and a removable memory drive 1214 to the system bus 1206. Examples of removable memory drives 1214 include magnetic disk drives and optical disk drives. The drives and their associated computer-readable media, such as a Digital Versatile Disc (DVD) 1216 provide non-volatile storage of computer readable instructions, data structures, program modules and other data for the computer device 1200. A single hard disk drive 1212 and a single removable memory drive 1214 are shown for illustration purposes only and with the understanding that the computing device 1200 can include several similar drives. Furthermore, the computing device 1200 can include drives for interfacing with other types of computer readable media.

The computing device 1200 may include additional interfaces for connecting devices to the system bus 1206. FIG. 12 shows a universal serial bus (USB) interface 1218 which may be used to couple a device to the system bus 1206. For example, an IEEE 1394 interface 1220 may be used to couple additional devices to the computing device 1200. Examples of additional devices include radar and image capture devices.

The computing device 1200 can operate in a networked environment using logical connections to one or more remote computers or other devices, such as a server, a router, a network personal computer, a peer device or other common network node, a wireless telephone or wireless personal digital assistant. The computing device 1200 includes a network interface 1222 that couples the system bus 1206 to a local area network (LAN) 1224. Networking environments are commonplace in offices, enterprise-wide computer networks and home computer systems.

A wide area network (WAN), such as the Internet, can also be accessed by the computing device, for example via a modem unit connected to a serial port interface 1226 or via the LAN 1224. Transmission of data can be performed using the LAN 1224, the WAN, or a combination thereof.

It will be appreciated that the network connections shown and described are exemplary and other ways of establishing a communications link between computers can be used. The existence of any of various well-known protocols, such as TCP/IP, Frame Relay, Ethernet, FTP, HTTP and the like, is presumed, and the computing device 1200 can be operated in a client-server configuration to permit an operator to retrieve data from, for example, a web-based server.

The operation of the computing device 1200 can be controlled by a variety of different program modules. Examples of program modules are routines, programs, objects, components, and data structures that perform particular tasks or implement particular abstract data types. The present invention may also be practiced with other computer system configurations, including hand-held devices, multi-processor systems, microprocessor-based or programmable consumer electronics, network PCs, minicomputers, mainframe computers, smartphones, tablets and the like. Furthermore, the invention may also be practiced in distributed computing environments where tasks are performed by remote processing devices that are linked through a communications network. In a distributed computing environment, program modules may be located in both local and remote memory storage devices.

In summary, advantages of certain embodiments of the present invention include an ability to more intuitively view and interact with front view and top view data, and in particular radar and image data.

Further advantages of certain embodiments of the present invention include an ability to quickly and easily monitor an area, without requiring complex surveying or accurate DTMs.

Yet a further advantage of certain embodiments of the present invention is the ability to efficiently and accurately analyse two-dimensional radar data in the context of a three dimensional model.

Still another advantage of certain embodiments of the present invention is that an operator can quickly and efficiently analyse an area remotely. Relatively unskilled workers, e.g. workers without formal surveying experience, are able to configure the system on-site for capture of data, which is then sent to the remote location.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method for displaying an area, the method including:
receiving, on a data interface, front view data of the area generated by an image capture device and top view data of the area generated by a radar module;
displaying, on a display device, a graphical user interface (GUI) including a front view of the area and a top view of the area, wherein the front view and the top view are generated from the front view data and the top view data and are aligned according to a shared line-of-sight from a fixed origin have overlapping field of view such that an identifiable location in one of the front view or the top view is identifiable in the other of the top view or the front view and the front view and the top view are aligned such that a line displayed on the GUI from a fixed origin that passes through the identifiable location in one of the front view or the top view also passes through the identifiable location in the other of the front view or the top view;

processing direct interaction between an operator and either one of the front view and the top view of the GUI to responsively rotate the top view and to translate the front view relative to the shared line-of-sight about the fixed origin; and displaying, on the display device, an updated GUI according to the direct interaction, wherein the updated GUI includes a translated front view of the area and a rotated top view of the area, and wherein the translated front view and the rotated top view are generated from the front view data and top view data and are aligned such that an effect caused by the direct interaction between an operator and one of the front view and the top view of the GUI causes a related effect in the other of the front view and the top view.

2. The method of claim 1 wherein the front view data and top view data come from two or more sources.

3. The method of claim 1 wherein the rotation of the top view is a rotation in azimuth, corresponding to translation of the front view horizontally.

4. The method of claim 1 wherein the translation of the front view is a left/right translation, corresponding to rotation of the top view in azimuth.

5. The method of claim 1 wherein the front view comprises an azimuth range of data of the area laterally and the top view comprises the azimuth range of the area rotationally.

6. The method of claim 1 wherein the interaction between the operator and the one of the front view and the top view comprises one of: rotating the top view; or translating the front view; or tilting the top view; or tilting the front view; or mapping a region or point selected in one of the front view or the top view to the other of the front view or the top view.

7. The method of claim 1 wherein a leftmost position of the top view corresponds to a leftmost position of the front view and a rightmost position of the top view corresponds to a rightmost position of the front view.

8. The method of claim 7 wherein the front view, top view, updated front view and updated top view relative to the line of sight element the front view includes a horizontal length ratio of a left portion length of the front view to a total length of the front view;

the top view includes an angle ratio of a left portion azimuth angle of the top view to a total azimuth range of the top view; and wherein horizontal length ratio is maintained as equal to the angle ratio during rotation of the top view and translation the front view relative to the shared line-of-sight about the fixed origin.

9. The method of claim 1 wherein the front view data comprises image data, and the top view data comprises radar data.

10. The method of claim 1 wherein the front view data comprises panoramic front view data that is generated from a plurality of photographic images.

11. The method of claim 1 wherein one or more of the front view and top view data comprises radar data, laser scanner data, mine survey data, or a computer rendered model.

12. The method of claim 1 wherein the graphical user interface comprises a further top view, wherein one of the top view and the further top view is overlaid over the other of the top view and the further top view.

13. The method of claim 12 wherein the further top view comprises an aerial photograph.

14. The method of claim 12 wherein the graphical user interface comprises an opacity interaction element, that defines an opacity of the one of the top view and the further top view that is overlaid over the other of the top view and the further top view.

15. The method of claim 1 wherein the graphical user interface includes an origin marker, illustrating the common origin.

16. The method of claim 1 wherein the graphical user interface comprises a zoom interaction element, that provides zoom functionality with respect to the front view and/or the top view.

17. A system for displaying an area of a mine including:
an image capture device for capturing one of front view data or top view data of the area;
a radar module for capturing one of front view data or top view data of the area not captured by the image capture device;
a data interface, for receiving the front view data and the top view data;
a display device;
a processor coupled to the display device and the data interface, and
a memory, coupled to the processor, the memory including instruction code executable by the processor for:
displaying, on the display device, a graphical user interface including a front view of the area and a top view of the area, wherein the front view and top view are generated from the front view data and top view data and are aligned according to a shared line-of-sight from a fixed origin have overlapping field of view such that an identifiable location in one of the front view or the top view is identifiable in the other of the top view or the front view and the front view and the top view are aligned such that a line displayed on the GUI from a fixed origin that passes through the identifiable location in one of the front view or the top view also passes through the identifiable location in the other of the front view or the top view;
processing a direct interaction between an operator and either one of the front view and the top view of the GUI to responsively rotate the top view and translate the front view relative to the shared line-of-sight about the fixed origin; and
displaying, on the display device, an updated graphical user interface according to the interaction, the updated graphical user interface including a translated front view of the area and a rotated top view of the area, wherein the translated front view and the rotated top view are generated from the front view data and top view data and are aligned such that an effect caused by the direct interaction between an operator and one of the front view and the top view causes a related effect in the other of the front view and the top view.

18. The system of claim 17 further including:
a camera, coupled to the data interface, for capturing the front view data or the top view data; and
a radar, coupled to the data interface, for capturing the top view data or the front view data.

19. The system of claim 18 wherein the camera and the radar are fixedly mounted to a frame.

20. The system of claim 18 wherein the camera and the radar are fixedly mounted to a frame such that the fields of view of the camera and the radar overlap.

21. The system of claim 17 wherein the interaction between an operator and one of the front view and the top view includes at least one of: rotating the top view; translating the front view; tilting the top view; tilting the front view; or mapping a region or point selected in one of the front view or the top view to the other of the front view or the top view.

22. A mine safety apparatus comprising:
- a radar module that generates top view data representing a top view of a mine;
- an image capture device that generates front view data representing a front view of the mine;
- a processor that receives the top view data and the front view data and generates a front view of the mine and a top view of the mine, wherein the front view of the mine and a top view of the mine have overlapping field of view such that an identifiable location in one of the front view or the top view is identifiable in the other of the top view or the front view;
- a display that displays the front view of the mine and the top view of the mine aligned according to a line of sight from a fixed origin such that a line from the fixed origin that passes through the identifiable location in one of the front view or the top view also passes through the identifiable location in the other of the front view or the top view; and
- a user interaction tool that operates such that an effect caused by direct interaction between a user and one of the front view of the mine or the top view of the mine causes a related effect in the other of the front view of the mine and the top view of the mine.

23. The mine safety apparatus of claim 22 wherein the user interaction tool operates such that rotation of the top view causes translation of the front view.

24. The mine safety apparatus of claim 22 wherein the user interaction tool operates such that translation of the front view causes rotation of the top view.

25. The mine safety apparatus of claim 22 wherein the effect caused by direct interaction is selected from: rotating the top view; translating the front view; tilting the top view; tilting the front view; mapping a region or point selected in one of the front view or the top view to the other of the front view or the top view.

* * * * *